US012730925B2

(12) United States Patent
Chauhan et al.

(10) Patent No.: US 12,730,925 B2
(45) Date of Patent: Sep. 8, 2026

(54) MASKING COMPLIANCE MEASUREMENT SYSTEM

(71) Applicant: NICE LTD, Ra'anana (IL)

(72) Inventors: Sourav Chauhan, New Delhi (IN); Kunal Khanvilkar, Pune (IN); LeAnn Hopkins, Lake Worth/Wellington, FL (US)

(73) Assignee: NICE LTD, Ra'anana (IL)

( * ) Notice: Subject to any disclaimer, the term of this patent is extended or adjusted under 35 U.S.C. 154(b) by 283 days.

(21) Appl. No.: 17/862,465

(22) Filed: Jul. 12, 2022

(65) Prior Publication Data

US 2024/0020408 A1 Jan. 18, 2024

(51) Int. Cl.

*G06F 21/62* (2013.01)
*G06F 18/21* (2023.01)
*G06N 5/025* (2023.01)

(52) U.S. Cl.

CPC ........ *G06F 21/6245* (2013.01); *G06F 18/217* (2023.01); *G06N 5/025* (2013.01); *G06F 2221/2141* (2013.01)

(58) Field of Classification Search

CPC ............... G06F 21/6245; G06F 18/217; G06F 2221/2141; G06N 5/025

See application file for complete search history.

(56) References Cited

U.S. PATENT DOCUMENTS 9,785,795 B2 * 10/2017 Grondin .............. G06F 21/6227
10,984,496 B1 * 4/2021 Rabb .................... A61B 6/5294
11,240,601 B1 * 2/2022 Saplakoglu ............ H03G 3/344

(Continued)

FOREIGN PATENT DOCUMENTS

EP 4016355 A2 * 6/2022 .......... H04M 3/5175

OTHER PUBLICATIONS

F. Hassan, D. Sánchez, J. Soria-Comas and J. Domingo-Ferrer, "Automatic Anonymization of Textual Documents: Detecting Sensitive Information via Word Embeddings," 2019 18th IEEE International Conference on Trust, Security and Privacy in Computing and Communications/13th IEEE International Conference O (Year: 2019).*

(Continued)

*Primary Examiner* — Cheng-Feng Huang
*Assistant Examiner* — Duilio Munguia
(74) *Attorney, Agent, or Firm* — Trupti P. Joshi

(57) ABSTRACT

A system is adapted to automatically evaluate compliance to data masking rules by a service provider. The system includes a processor and a non-transitory computer readable medium carrying instructions. The instructions include receiving a list of private data elements for which masking is required, and receiving a transcript of a particular interaction between the service provider and a customer, where the transcript includes data elements, at least of which is a private data element. The instructions also include analyzing the transcript with natural language processing to identify times or locations within where private data elements are recorded; determining, based on a set of compliance rules and the analyzed transcript, whether any private data element are unmasked at the identified times or locations; and, if a private data element is unmasked, issuing an output related to the unmasked private data elements.

20 Claims, 13 Drawing Sheets

(56) References Cited

U.S. PATENT DOCUMENTS

| | | | | |
|---|---|---|---|---|
| 11,250,876 | B1 * | 2/2022 | McCloskey | G06N 20/10 |
| 11,562,087 | B2 * | 1/2023 | Antonatos | G06N 5/01 |
| 11,755,848 | B1 * | 9/2023 | Dan | G06N 20/00 704/270.1 |
| 11,862,148 | B2 * | 1/2024 | Sivasubramanian | H04L 9/0643 |
| 2012/0239540 | A1 * | 9/2012 | Rogers, Jr. | G06F 21/6245 726/26 |
| 2014/0380105 | A1 * | 12/2014 | Michel | G06F 11/0769 714/57 |
| 2019/0245973 | A1 * | 8/2019 | Dwyer | H04M 3/5175 |
| 2020/0184080 | A1 * | 6/2020 | Trim | G06F 21/84 |
| 2020/0293675 | A1 * | 9/2020 | Antonatos | G06F 21/6218 |
| 2020/0293688 | A1 * | 9/2020 | Nitsan | G06F 11/30 |
| 2021/0158805 | A1 * | 5/2021 | Sivasubramanian | G06F 40/279 |
| 2021/0334406 | A1 * | 10/2021 | Saad | G06F 16/148 |
| 2022/0272124 | A1 * | 8/2022 | Zawadzki | H04M 15/62 |
| 2022/0292218 | A1 * | 9/2022 | Zarecki | G06F 21/6254 |

OTHER PUBLICATIONS https://datasquirrel.ai/data-security Worry-free data processing. From data masking to strict data retention, to safe use of AI by separating data processing from creating insights, to regular . (Year: 2021).*

* cited by examiner

| Interaction_id | Mask Performed | Agent | Total Expected mask(T) | Mask Hit (MH) | Mask Miss (MM) | Masking Adherence |
|---|---|---|---|---|---|---|
| 9da5-421c-b7b4 | Agent | John | 3 | 2 | 1 | 0.7 |
| 7fa5-735c-b7b2 | System | Mark | 4 | 4 | 0 | 1 |
| 6ba5-911c-b7b1 | Agent | Samuel | 3 | 0 | 3 | 0 |
| 2mb5-248c-b7b9 | Agent | Adam | 2 | 1 | 1 | 0.5 |

| Interaction_id | mask_performed | Agent | Total Expected mask(T) | Mask Hit (MH) | Mask Miss (MM) | Masking Adherence |
|---|---|---|---|---|---|---|
| 9da5-421c-b7b4 | Agent | John | 3 | 2 | 1 | 0.7 |
| 7fa5-735c-b7b2 | System | Mark | 4 | 4 | 0 | 1 |
| 6ba5-911c-b7b1 | Agent | Samuel | 3 | 0 | 3 | 0 |
| 2mb5-248c-b7b9 | Agent | Adam | 2 | 1 | 1 | 0.5 |

MASKING COMPLIANCE MEASUREMENT SYSTEM

TECHNICAL FIELD

The subject matter described herein relates to systems, methods, and devices for generating rules for verifying compliance to data masking rules, detecting non-compliance, and encouraging or rewarding compliance. This masking adherence measurement system has particular but not exclusive utility for in call centers and other customer-facing support centers.

BACKGROUND

In call centers and other contact centers, customer privacy is a primary concern. In recent times, an increase in cybersecurity threats has increased the urgency of compliance with privacy laws, rules, guidelines, and policies. Data security can therefore be one of the most significant concerns for businesses that perform outsourced customer support and other such customer-facing operations. The term "customer service" is thus widely seen as including not only aiding the customer and providing a good environment for the customer, but also keeping the customer's data safe. For this reason, contact centers invest considerable effort into data security, both to reduce liability and to build customer trust, which can both be important contributors to business growth.

Contact centers often record and store the computer screen activity of their agents, and/or voice interaction with customers. The recorded sessions can be retrieved and played-back, for example, to help resolve a dispute with a customer regarding a transaction performed during the session, or for monitoring the quality and performance of agents or service representatives. Recorded sessions often include sensitive information that could be highly damaging to a customer if unauthorized access occurred. For example, financial applications may display customer credit card numbers, bank account numbers, or social security numbers. Masking may be desired or even required for such sensitive information. At the present time, such masking may involve skipping the recording of specific portions of the interaction.

Such masking is often driven by manual activity on the part of the agent or service representative, such as turning off a recording at certain times, and then turning it back on again once the sensitive information is no longer visible or audible. Unfortunately, agents or service representatives with improper or incomplete training may not be fully aware of which information needs to be masked and which does not. Agent training on data management incurs time and cost. Even where all agents are properly trained and diligent, human fallibility implies that some masking failures will nevertheless occur.

In some cases, masking may be performed by automated systems. However, even in these cases, network glitches and software application glitches can still lead to masking failures. Detecting masking failures is typically a costly, time-consuming, manual process that involves viewing or listening to recorded interactions and noting unmasked sensitive data. This makes non-compliance hard to detect or quantify, which has the potential to impact brand reputations, disrupt the customer experience, and potentially lead to security breaches.

In an example, in the Americas, penalties for non-compliance can be between $5,000-$100,000 per month until Payment Card Industry (PCI) audits prove compliance has returned to an acceptable level. Financial losses and reputational damage can be far higher in cases where a data breach occurs. Thus, need exists for an improved data masking system to protect data privacy.

SUMMARY

A masking adherence measurement system is disclosed, which can analyze a transcript of a customer support interaction to verify that private data is masked properly. By providing detailed, actionable metrics in real time or near-real time, the masking adherence measurement system may effectively motivate agents responsible for call masking. The system can also provide reports or evaluations that compare the compliance levels of different agents within an organization, that compare the compliance of an agent vs. organization or industry averages, or that compare the performance of one organization against that of another. This data can be used by managers. In addition, the system can provide coaching or training, by providing clear metrics on where non-compliance is more or less likely to occur.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system adapted to automatically evaluate compliance to data masking rules by a service provider. The system includes a processor and a non-transitory computer readable medium operably coupled thereto, the computer readable medium including a plurality of instructions stored in association therewith that are accessible to, and executable by, the processor, to perform operations. The operations include: receiving a list of private data elements for which masking is required; receiving a transcript of a particular interaction between the service provider and a customer, where the transcript includes a plurality of data elements that includes at least one private data element of the list of private data elements; analyzing the transcript with natural language processing to identify times or locations within the transcript where the at least one private data element is recorded; determining based on a set of compliance rules and the analyzed transcript whether, at the identified times or locations, any private data element of the at least one private data element is unmasked; and if a private data element of the at least one private data element is unmasked, issuing an output related to the at least one unmasked private data element. Other embodiments of this aspect include corresponding computer systems, apparatus, and computer programs recorded on one or more computer storage devices, each configured to perform the actions of the methods.

Implementations may include one or more of the following features. In some aspects, the transcript includes a recording of at least one of a text interaction, a text translation of a voice interaction, or computer screen activity. In some aspects, the list of private data elements includes at least one of a social security number, a national identification number, a credit card number, a person's name, a company name, an organization name, a phone number, a postal code, a date of birth, an email address, a physical address, a postal address, an income level, a net asset value, a purchase history, or medical information. In some aspects, the output includes a mask compliance coaching module, a link to the mask compliance coaching module, or instructions for accessing the mask compliance coaching module. In some aspects, the operations further include computing a compliance statistic for at least one of the particular interaction or a plurality of interactions including the particular interaction. In some aspects, the output includes an evaluation of the service provider or a report comparing the service provider to another service provider. In some aspects, the compliance statistic includes at least one of a total number of private data elements, a total number of masked private data elements, a total number of unmasked private data elements, a ratio, fraction, or percentage of private data elements that are masked, or a ratio, fraction, or percentage of private data elements that are unmasked, an average of any of the foregoing, or a ratio between any two of the foregoing. In some aspects, the compliance statistic includes a compliance score for the service provider. In some aspects, if the compliance score for the service provider is below a first threshold value, issuing a coaching output including at least one of a mask compliance coaching module, a link to the mask compliance coaching module, or instructions for accessing the mask compliance coaching module. In some aspects, if the compliance score for the service provider is above a second threshold value, issuing a reward or recognition output. In some aspects, at least one private data element of the list of private data elements is required to be private by a law or government regulation. Implementations of the described techniques may include hardware, a method or process, or computer software on a computer-accessible medium.

One general aspect includes a computer-implemented method adapted to automatically evaluate compliance to data masking rules by a service provider. The computer-implemented method includes receiving a list of private data elements for which masking is required. The computer-implemented method also includes receiving a transcript of a particular interaction between the service provider and a customer, where the transcript includes a plurality of data elements that includes at least one private data element of the list of private data elements. The computer-implemented method also includes, with natural language processing, analyzing the transcript to identify times or locations within the transcript where the at least one private data element is recorded. The computer-implemented method also includes, based on a set of compliance rules and the analyzed transcript, determining whether, at the identified times or locations, any private data element of the at least one private data element is unmasked. The computer-implemented method also includes, if a private data element of the at least one private data element is unmasked, issuing an output related to the at least one unmasked private data element. Other embodiments of this aspect include corresponding computer systems, apparatus, and computer programs recorded on one or more computer storage devices, each configured to perform the actions of the methods.

Implementations may include one or more of the following features. In some aspects, the transcript includes a recording of at least one of a text interaction, a text translation of a voice interaction, or computer screen activity. In some aspects, the list of private data elements includes at least one of a social security number, a national identification number, a credit card number, a person's name, a company name, an organization name, a phone number, a postal code, a date of birth, an email address, a physical address, a postal address, an income level, a net asset value, a purchase history, or medical information. In some aspects, the computer-implemented method further includes computing a compliance statistic for at least one of the particular interaction or a plurality of interactions including the particular interaction. In some aspects, the compliance statistic includes at least one of a total number of private data elements, a total number of masked private data elements, a total number of unmasked private data elements, a ratio, fraction, or percentage of private data elements that are masked, or a ratio, fraction, or percentage of private data elements that are unmasked, an average of any of the foregoing, or a ratio between any two of the foregoing. In some aspects, if the compliance statistic is below a first threshold value, then the output is a coaching output including at least one of a mask compliance coaching module, a link to the mask compliance coaching module, or instructions for accessing the mask compliance coaching module. In some aspects, if the compliance statistic is above a second threshold value, then the output is a reward or recognition output. In some aspects, the output includes an evaluation of the service provider including the compliance statistic or a report comparing the compliance statistic to a second compliance statistic of a second service provider. In some aspects, the rule-based machine learning algorithm is a learning classifier system, association rule learning system, or artificial immune system. Implementations of the described techniques may include hardware, a method or process, or computer software on a computer-accessible medium.

BRIEF DESCRIPTION OF THE DRAWINGS

Illustrative embodiments of the present disclosure will be described with reference to the accompanying drawings, of which.

DETAILED DESCRIPTION

Figure 1:
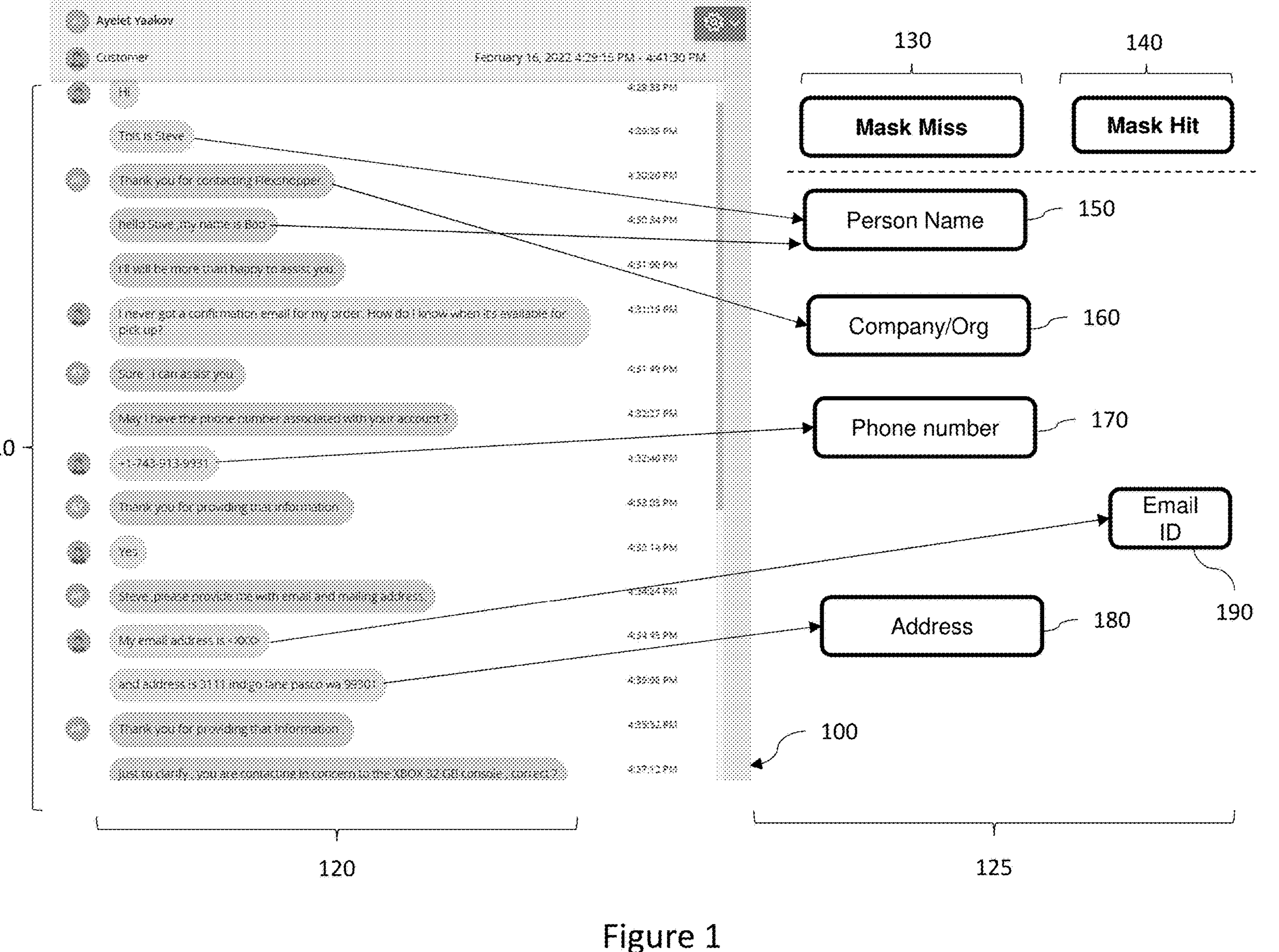
FIG. 1 is an annotated representation of an example transcript of a customer support interaction, according to aspects of the present disclosure.

A long-felt need exists for systems and methods to detect, quantify, and correct non-compliance with data masking requirements. The present disclosure provides a masking adherence module (MAM) or masking adherence measurement system, which can analyze a transcript of an interaction between a customer and an agent or support provider, to verify that masking events occur in compliance with legal and organizational requirements. The masking adherence measurement system may for example be helpful in identifying exposed customer data, which may thus improve data security and reduce the occurrence and/or severity of data breaches.

By providing detailed, actionable metrics in real time or near-real time, the masking adherence module may effectively motivate agents responsible for call masking, thus leading to measurable, reportable improvements in masking compliance. The system can also provide reports or evaluations that compare the compliance levels of different agents within an organization, that compare the compliance of an agent vs. organization or industry averages, or that compare the performance of one organization against that of another. This data can be used by managers to perform individual or group evaluations based on agent call masking adherence. In addition, the system can provide coaching or training, and also assist the teams who develop coaching or training packages, by providing clear metrics on where non-compliance is more or less likely to occur.

The masking adherence measurement system can also be used to keep track of those agents who can adhere to call masking guidelines efficiently and effectively, and can either advise management teams on appropriate awards and recognition, or can issue such awards and recognition automatically, for example through gamification of the masking system that provides direct visual and/or auditory feedback in real time or near-real time.

The system can automatically evaluate compliance to data masking rules by a service provider, service representative, or agent. The system includes a processor executing software instructions, which instructions store or receive a masking policy (e.g., a list of data elements, such as account number or identification numbers, that are considered private and for which masking is therefore required). The system can then receive a transcript of a particular interaction between the service provider and a customer. The transcript may for example be provided by a transcription service, by a software program (e.g., a speech recognition and/or optical character recognition (OCR) program), or otherwise, and may be derived from a recording of a text interaction, a voice interaction, and/or computer screen activity from a text or voice interaction.

The transcript includes data elements provided by the customer (name, address, etc.), some of which are considered private and are subject to masking. Using a name entity recognition natural language processing (NER NLP) algorithm, the system scans the transcript line-by-line or element-by-element, looking for timestamps or locations within the transcript where private data is recorded, and then determines whether, at the identified times or locations, the private data is masked or unmasked.

Private data elements requiring masking may for example include, but are not limited to, a social security number, a national identification number, a credit card number, a person's name, a company name, an organization name, a phone number, a postal code, a date of birth, an email address, a physical address, a postal address, financial account information, marital status, or health/medical information that may be subject to Health Insurance Privacy and Portability Act (HIPAA) restrictions.

The system can assemble compliance statistics not only for a particular interaction, but for a particular agent across multiple interactions, or for all interactions across a particular organization. These statistics can be stored, compared, analyzed, or processed as suits the needs of the organization.

The present disclosure aids substantially in the enforcement of masking compliance rules, by detecting and measuring non-compliance in real time or near-real time, evaluating and ranking agents with respect to masking compliance, and providing coaching to non-compliant agents. Implemented on a processor in communication with a memory structure or database, the system disclosed herein provides practical reductions in exposure of sensitive data. This improved masking compliance measurement transforms a subjective process that is difficult to monitor or audit into a fast, accurate, repeatable, and resource-efficient measurement process that can be executed against live or stored transcripts on demand, without the normally routine need for an auditor to listen to live or recorded calls and make subjective judgments. This unconventional approach improves the functioning of the computer systems of the service provider (e.g., a call center or other contact center), by reducing the volume of exposed data and thus reducing the provider's vulnerability to data breaches.

The masking adherence measurement system may be implemented as a process at least partially viewable on a display, and operated by a control process executing on a processor that accepts user inputs from a keyboard, mouse, or touchscreen interface, and that is in communication with one or more databases. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

The following terms may be used in, or be relevant to, the present disclosure:

NPS—Net Promoter Score
QM—Quality Management
IA—Interaction Analytics
MAM—Masking Adherence Module
NLP—Natural Language Processing
NER—Name Entity Recognition
PRD—Product Requirement Documents
SRS—Software Requirements Specifications
HLD—High Level Design document
SDD—Software Detailed Design These descriptions are provided for exemplary purposes only, and should not be considered to limit the scope of the dimensional reduction integrated fraud management system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is an annotated representation of an example transcript 100 of a customer support interaction, according to aspects of the present disclosure. The transcript 100 may for example be recorded in memory or in a database, and may be a text interaction, a text translation of a voice interaction, or computer screen activity. The transcript 100 includes a plurality of text lines 110 comprising text 120, each of which represents an action or statement made by either the customer or the agent. The text lines 110 can include information that includes either public data elements, private data elements, or a combination thereof. Public data elements may for example include a username or handle, the date or time of the interaction, the general nature of the customer's concern, etc. Private data elements may for example include a social security number, a national identification number, a credit card number, a person's full name, a company name, an organization name, a phone number, a postal code, a date of birth, an email address, a physical address, a postal address, an income level, a net asset value, a purchase history, financial account information, marital status, medical information, etc. A service provider such as a call center may for example develop, or receive, a list of data elements that are to be treated as private. The list may be based at least in part on laws or government regulations, but may also come from industry standards, common practice, or the service provider's own judgment.

In the example shown in FIG. 1, the transcript 100 includes a person's name 150, a company or organization name 160, a phone number 170, a physical address 180, and an email address 190, each of which is considered private information. The annotations 125 may for example be produced by a human auditor as part of an audit, performance review, or training process. In the annotations 125, it can be seen that the person's name 150, company or organization name 160, phone number 170, physical address 180, are indicated as "mask misses" 130, because the values of these data elements are shown in the transcript. When private data elements are shown in the transcript, this indicates that the agent either did not attempt to mask these data elements during the interaction, or did not succeed in the masking attempts. Since the person's name 150 appears twice in the transcript 100, it may be counted as two mask misses 130 rather than just one.

However, the email address 190 is indicated as a "mask hit" 140, because the email address appears in the indicated text line 110 as "<XXX>", which indicates that the agent successfully masked the email address. Thus, the transcript 100 includes five mask misses and one mask hit, which equates to a compliance rate of just 1/6 or 16.7%. Such a compliance rate may be considered unacceptably low. It is an object of the present disclosure to provide agents, managers, and organizations with real-time and near-real-time compliance measurements, with a goal of recognizing high-compliance agents and improving the performance of low-compliance agents.

An analysis of the transcript in this example might be stored as:

```
{
"interaction_id": "1234",
"masking_events" :
  [
    {
      "start_time": "4:34:25",
      "end_time" : "4:35:00"
    }
  ]
}
```

Organizational masking compliance fields configured:
- Person name
- Phone Number
- Company/Org
- EmailId
- Address Total Expected Mask (T)=sum of all masking events from transcript=4
Mask Hit=1
Mask Miss=5
Masking Adherence=1/6=0.17==17% where the start time and end time mark the masking of the email address 190.

Figure 2:
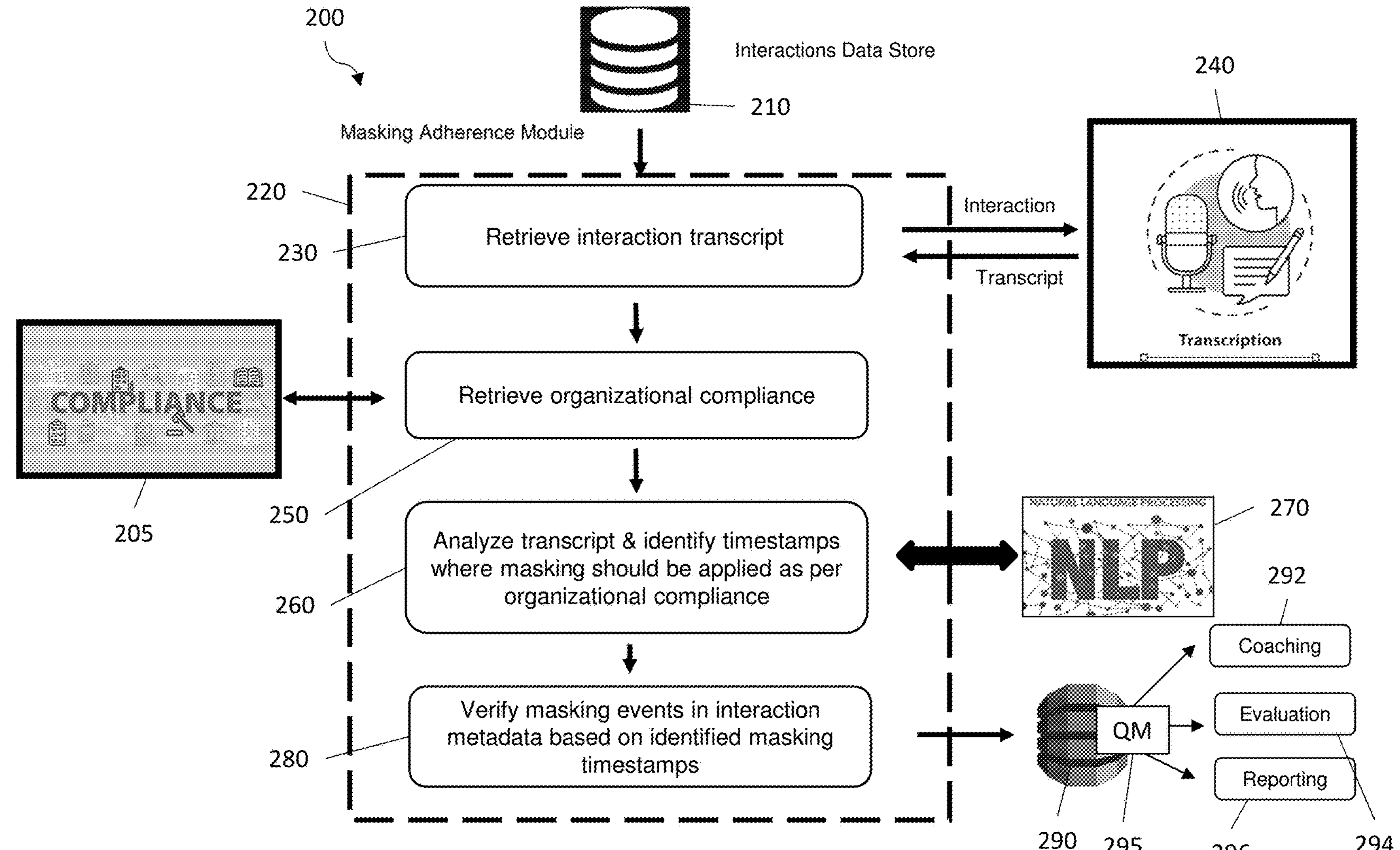
FIG. 2 is a representation, in block diagram form, of at least a portion of an example masking adherence measurement system, according to aspects of the present disclosure.

FIG. 2 is a representation, in block diagram form, of at least a portion of an example masking adherence measurement system 200, according to aspects of the present disclosure. The masking adherence measurement system 200 may for example operate on a processor circuit 1350 (see FIG. 13). There are multiple steps involved in the overall working of masking adherence module 220. A compliance department or compliance tool may for example trigger the operation of a masking adherence module 220, which is operationally linked to an interactions data store 210. The operations data store 210 may for example store recordings of interactions that have occurred between agents and customers of the contact center or another affiliated or unaffiliated service provider.

In step 230, the masking adherence module 220 retrieves from the interactions data store 210 an interaction recording for a particular interaction, and passes it to a transcription module or IA (Interaction Analytics) module 240. The transcription module 240 may convert the interaction recording (e.g., an audio recording or other recording) into a text transcript as shown for example in FIG. 1.

In step 250, the masking adherence module 220 retrieves organizational compliance data 205. The organizational compliance data 205 can be rules defined by an organization which define what data fields needs to be masked while recording an interaction. For example, credit card numbers or personal details, or any customer confidential information, may be defined as private by the organizational compliance data.

In step 260, the masking adherence module 220 performs transcript analysis. The transcript my for example be processed using name entity recognition natural language processing (NER NLP). The analysis may for example be performed by an NER NLP module 270, to identify portions of the text that can be consider masking candidates as defined in the defined organizational compliance data, and may therefore need to be masked.

In step 280, the masking adherence module 220 verifies masking events in the analyzed transcript. Validating the masking events in the recorded interaction and computing the masking adherence may involve generating a masking adherence score as described above, which can then be stored into a masking adherence database 290 so that it can be used by various downstream applications for specific purposes. A quality management (QM) application 295 may then utilize this score to produce coaching 292, evaluations 294, and reporting 296. Similarly, a gamification module may utilize this information to set the organization goals and metric and accordingly rewards and recognition will be provided, as described below.

The NER NLP algorithm, in analyzing the interaction transcript and identifying expected mask events, may use named entity recognition (NER) to identify and classify named entities. The raw and structured text from the transcript may be taken as an input, and named entities may be classified into different categories like phone number, credit card number or social security number (SSN). This may involve preparing an array of expected mask events consisting of a mask type and timestamp which is used further to validate interaction metadata. Full data structures of the data can be used for the architecture, data flow and algorithms described above.

The interaction data store 210 may for example include a table-oriented database in which following attributes are specified:

TABLE 1

| HistoricalInteractions |
|---|
| tenantId: String<br>interactionId: String<br>interactionDuration: Number<br>interactionStartTime: Number<br>interactionEndTime: Number<br>interactionDate: Date<br>routingSkills: String<br>agentID: String<br>customerFeedback: Number<br>ageentName: String<br>recordings: Array |

Other data structures, involving other data, may be used instead or in addition, without departing from the spirit of the present disclosure. Before continuing, it should be noted that the examples described above are provided for purposes of illustration, and are not intended to be limiting. Other devices and/or device configurations may be utilized to carry out the operations described herein.

In is noted that block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Figure 3:
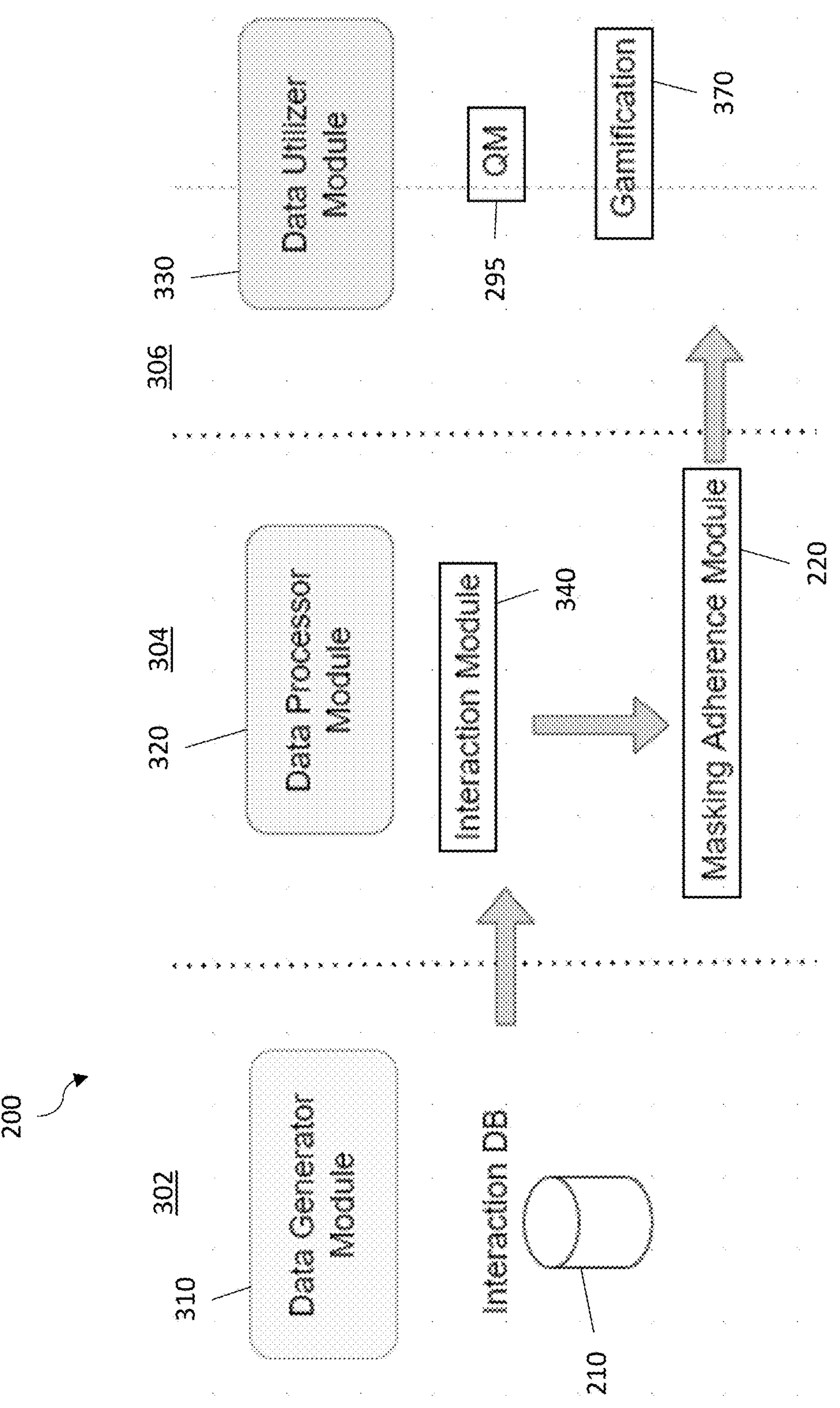
FIG. 3 is a representation, in block diagram form, of at least a portion of an example masking adherence measurement system, according to aspects of the present disclosure.

FIG. 3 is a representation, in block diagram form, of at least a portion of an example masking adherence measurement system 200, according to aspects of the present disclosure. In the example shown in FIG. 3, the masking adherence measurement system 200 includes a first layer 302 that contains a data generator module 310, which is responsible for collecting information from various data sources and storing it in the interaction database 210. This information is then passed to a second layer 304, which includes a data processor module 320. The data processor module 320 is responsible for analyzing and processing the collected data. An interaction module 340 passes data to the masking adherence module 220, which determines the masking adherence score of an interaction. This score is then passed to a third layer 306, which includes a data utilizer module 330. The data utilizer module is responsible for utilization of the masking adherence score to perform evaluation and relative coaching program will be assigned to the agents, via a quality management (QM) module 295, and to assist gamification project to keep track of the agents with good masking adherence score meeting a desired threshold or relative to other agents, and accordingly rewards and recognition will be provided, via a gamification module 370.

Thus, the masking adherence measurement system can receive a list of private data elements for which masking is required, receiving a transcript of a particular interaction between the service provider and a customer, including among its data elements at least one private data element. The system can analyze the transcript with natural language processing to identify times or locations within the transcript where private data is recorded, and determine (based on a set of compliance rules and the analyzed transcript) whether, at the identified times or locations, any private data element is unmasked. If private data is unmasked, the system can issue an output such as a report or other notification, or can aggregate masking adherence data and issue outputs based on the aggregated data.

FIGS. 4, 6-7 and 9-11 show flow diagrams of example methods, in accordance with embodiments of the present disclosure. It is understood that the steps of the methods described herein may be performed in a different order than shown or described. Additional steps can be provided before, during, and after the steps as shown, and/or some of the steps shown or described can be replaced or eliminated in other embodiments. One or more of steps of the methods can be carried by one or more devices and/or systems described herein, such as components of the system 200 and/or processor circuit 1350 (see FIG. 13).

The flow diagrams provided herein are for exemplary purposes; a person of ordinary skill in the art will recognize myriad variations that nonetheless fall within the scope of the present disclosure. The logic of the methods may for example be shown as sequential. However, similar logic could be parallel, massively parallel, object oriented, real-time, event-driven, cellular automaton, or otherwise, while accomplishing the same or similar functions. In order to perform the method, a processor circuit (e.g., processor circuit 1350 of FIG. 13) may divide each of the steps described herein into a plurality of machine instructions, and may execute these instructions at the rate of several hundred, several thousand, several million, or several billion per second, in a single processor or across a plurality of processors. Such rapid execution may be necessary in order to execute one or more of the methods in real time or near-real time as described herein. For example, in some embodiments, the system may need to analyze customer interactions as soon as they are complete, to provide a real-time score to the agent, or may need to analyze batches of hundreds or thousands of interactions at a time, either in real time or near-real time.

Figure 4:
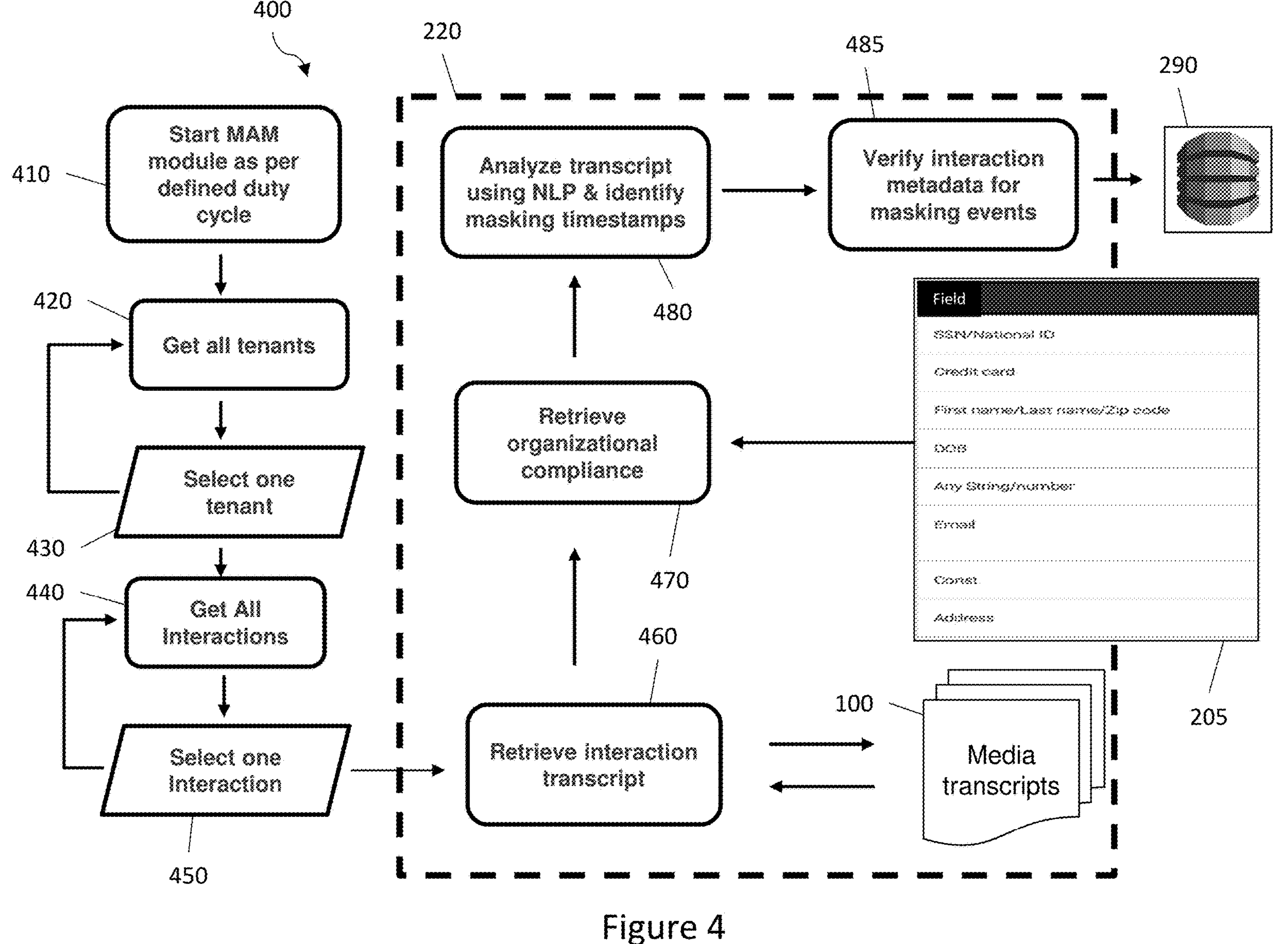
FIG. 4 is a representation, in flow diagram form, of at least a portion of an example masking adherence measurement method, according to aspects of the present disclosure.

FIG. 4 is a representation, in flow diagram form, of at least a portion of an example masking adherence measurement method 400, according to aspects of the present disclosure.

In step 410, the mask adherence module (MAM) 220 is initiated by a user input, or according to a duty cycle. The duty cycle may for example be a time period in which the MAM 220 is run periodically to calculate masking adherence scores (e.g., once per minute, once per hour, once per day, once per week, or otherwise).

In step 420, the method includes fetching all of the tenant information (e.g., all of the information for all of the agents of a particular call center). A tenant may for example be an individual user of the masking adherence measurement system, a group of users, or an entire department or company that uses the system. For example, the masking adherence measurement system may be a product for contact center industries that use the system to manage their businesses. Each contact center or contact center parent company could be viewed as a tenant of the system.

In step 430, the method includes selecting one tenant, and performing each of the following steps for that tenant. Step 430 then repeats until all available tenants have been selected.

In step 440, the method includes fetching (e.g., from the interactions database) all of the interactions for the selected tenant.

In step 450, the method includes selecting one interaction, passing it to the MAM 220, and performing each of the following steps for that interaction. Step 450 then repeats until all available interactions have been selected.

In step 460, the method includes retrieving the transcript 100 of the selected interaction from the IA module 240 (see FIG. 2). The transcript 100 associated with the interaction will be used in analyzing and identifying the masking instances as per the defined organizational compliance.

In step 470, the method includes retrieving the defined organizational compliance data 205.

In step 470, the method includes analyzing the transcript 100 (e.g., using the NEP NLP module 270 (see FIG. 2) to identify a collection of masking candidates with associated timestamps. This output is interaction metadata which can then be used to compare with the actual masking events of the recorded interaction, and to compute the masking adherence.

In step 485, the method includes verifying the calculated interaction metadata against the recorded interaction masking events to compute the masking adherence. This masking adherence score stored into the masking adherence database 290 so that it can be used by various downstream applications for specific purposes. At this step, the method may also include distributing the masking adherence score to relevant applications as described below), and/or issuing an output (e.g., to a display) that includes the masking adherence score.

Relevant downstream applications may for example include the gamification application (to provide at least one reward or recognition to the agent when the masking adherence score is above a predefined threshold) and the quality management application (to assign a coaching program when the masking adherence score is below the predefined threshold.

Figure 5:
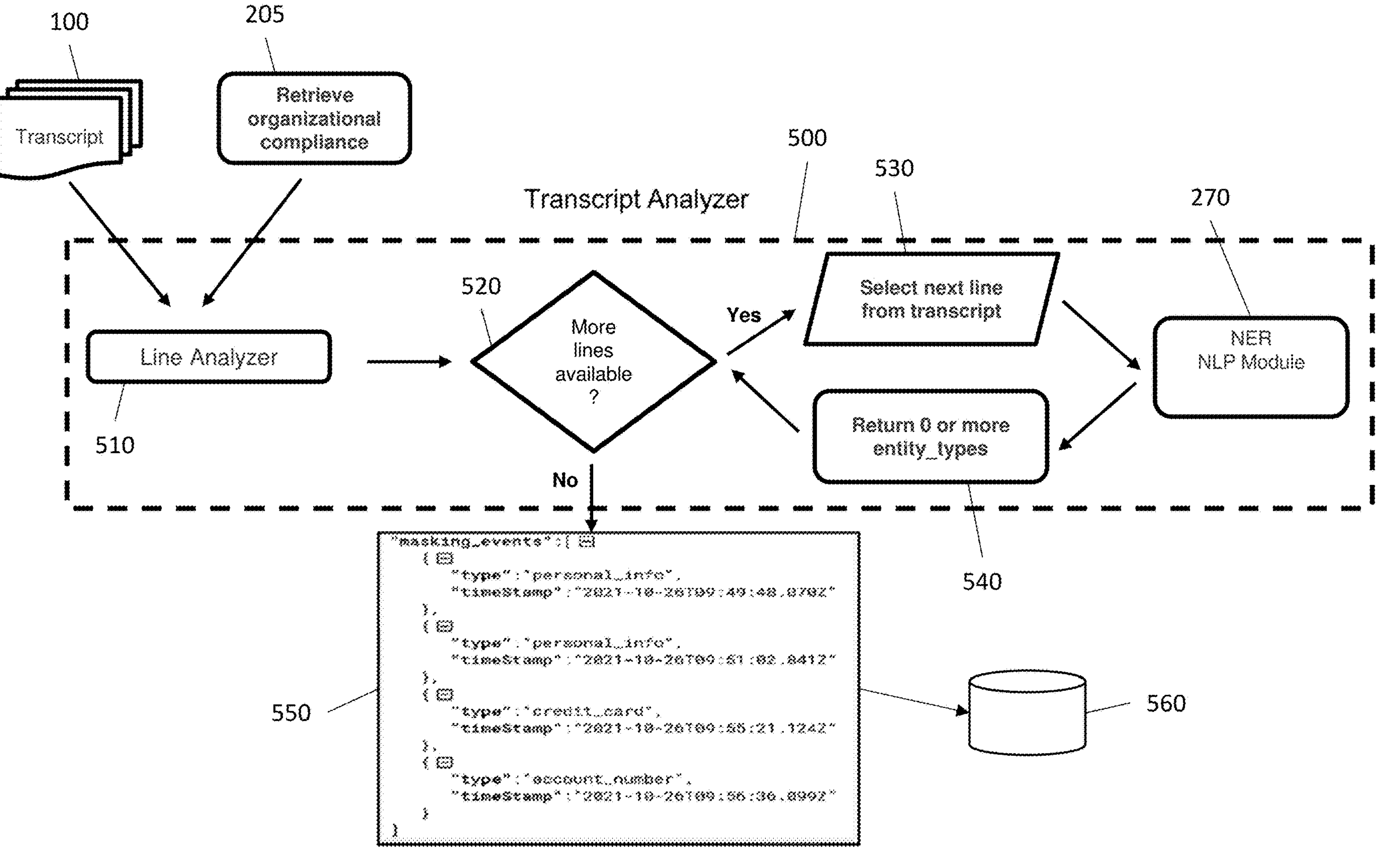
FIG. 5 is a representation, in block diagram form, of at least a portion of an example transcript analyzer module, according to aspects of the present disclosure.

FIG. 5 is a representation, in block diagram form, of at least a portion of an example transcript analyzer module 500, according to aspects of the present disclosure. The transcript analyzer module 500 may for example operate on a processor circuit 1350 (see FIG. 13). The transcript analyzer module 500 includes a line analyzer module 510 that receives one or more transcripts 100 and the organizational compliance data 205. The line analyzer parses the transcript into individual lines of text, where for example each line may represent either the agent or the customer speaking, and no line contains speech by both the agent and the customer.

In step 520, the transcript analyzer 500 determines whether there is another line available. If yes, execution proceeds to step 530. If no, the transcript analyzer outputs a formatted masking candidate list 550. In an example, the formatted masking candidate list 550 is stored in a total masking datastore 560.

In step 530, the transcript analyzer 500 selects the next line of the transcript, and passes it to the NER NLP module 270.

The NER NLP module 270 analyzes the line to determine whether it contains any references private data as defined by the compliance data 205, and if so, to add it to an array containing details of the identified masking candidates. Execution then proceeds to step 540.

In step 540, the NER NLP module returns the entity types (e.g., the types of private data) associated with any identified masking candidates. There may be any number of entity types in the current line of the transcript, from zero (if no candidates were identified), to one, two, three, or more entity types. Execution then returns to step 520.

The formatted masking candidate list 550 includes each masking candidate identified in the transcript, including the entity type (e.g., the type of private data) and a timestamp indicating when the private data was spoken, typed, or discussed.

The following is an example algorithm to analyze transcript and identify expected total masking events:

```
text="Customer: its, 112-11-2222"
# Set up the engine, loads the NLP module (spaCy model by default)
# and other PII recognizers
analyzer = AnalyzerEngine( )
# Call analyzer to get results
results = analyzer.analyze(text=text,
                           entities=["US_SSN"],
                           language='en')
print(results)
# Analyzer results are passed to the AnonymizerEngine for anoymization
anonymizer = AnonymizerEngine( )
anonymized_text = anonymizer.anonymize(text=text,analyzer_results=results)
print(anonymized_text)
[type: US_SSN, start: 15, end: 26, score: 0.5]
test: Customer: its, <US_SSN>
items:
```

-continued

```
[
  {'start': 15, 'end': 23, 'entity_type': 'US_SSN', 'text': '<US_SSN>', 'operator': 'replace'}
]
from presidio_analyzer import AnalyzerEngine
from presidio_anonymizer import AnonymizerEngine
test="My phone number is 212-555-5555"
# Set up the engine, loads the NLP module (spaCy model by default)
# and other PII recognizers
analyzer = AnalyzerEngine( )
# Call analyzer to get results
results = analyzer.analyze(text=text,
                           entities=["PHONE_NUMBER"],
                           language='en')
print(results)
# Analyzer results are passed to the AnonymizerEngine for anoymization
anonymizer = AnonymizerEngine( )
anonymized_text = anonymizer.anonymize(text=text,analyzer_results=results)
print(anonymized_text)
[type: PHONE_NUMBER, start: 19, end: 31, score: 0.75]
test: My phone number is <PHONE_NUMBER>
items
[
  {'start': 19, 'end': 33, 'entity_type': 'PHONE_NUMBER', 'text': '<PHONE_NUMBER>', 'operator': 'replace'}
]
```

The following is an example masking candidate list 550:

```
"masking_events": [
  {
    "type" : "personal_info",
    "timeStamp" : "2021-10-26T09:49:48.070Z"
  },
  {
    "type" : "personal_info",
    "timeStamp" : "2021-10-26T09:51:02.841Z"
  },
  {
    "type" : "credit_card",
    "timeStamp" : "2021-10-26T09:55:21.124Z"
  },
  {
    "type" : "account_number",
    "timeStamp" : "2021-10-26T09:56:36.099Z"
  }
]
```

Figure 6:
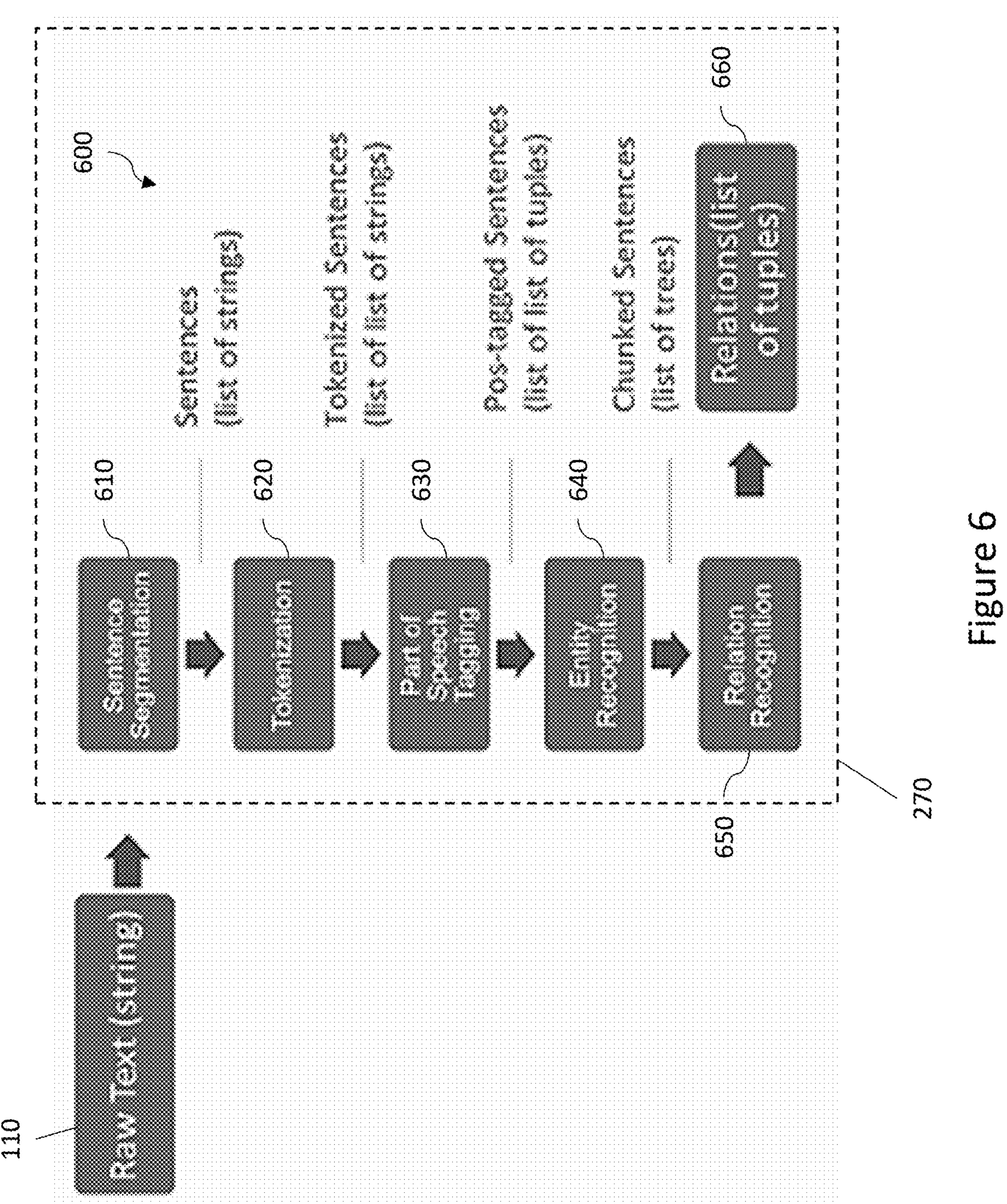
FIG. 6 is a representation, in flow diagram form, of at least a portion of an example NER NLP method that may be executed for example by an NER NLP module, according to aspects of the present disclosure.

FIG. 6 is a representation, in flow diagram form, of at least a portion of an example NER NLP method 600 that may be executed for example by an NER NLP module 270, according to aspects of the present disclosure. The NER NLP method 400 may for example be an algorithm to analyze the interaction transcript and identify expected masking events. Named entity recognition (NER) is the process of NLP which deals with identifying and classifying named entities. The raw and structured text from the transcript is taken, and named entities are classified into different categories, like phone number, credit card number or SSN, to prepare an array of expected mask events consisting of mask type and timestamp that is used further to validate interaction metadata.

In step 610, the NER NLP module 270 receives a line of text 110 from the interaction transcript (e.g., served to the NER NLP module 270 by the line analyzer 510 (see FIG. 5)), and segments the line into sentences, each of which becomes a separate string.

In step 620, the method includes tokenizing the segmented sentences into a list of the sentence strings.

In step 630, method includes tagging the tokenized strings according to the parts of speech of the words found in the strings, to produce a list of tuples.

In step 640, the method includes entity recognition, e.g., recognizing words associated with protected data types, thus yielding chunked sentences in the form of a list of sentence trees.

In step 650, the method includes recognizing relations between the entities, thus yielding a list 660 of tuples or relations. This is the portion of the array of expected mask events contributed by the current line of the transcript. The method is now complete.

Figure 7:
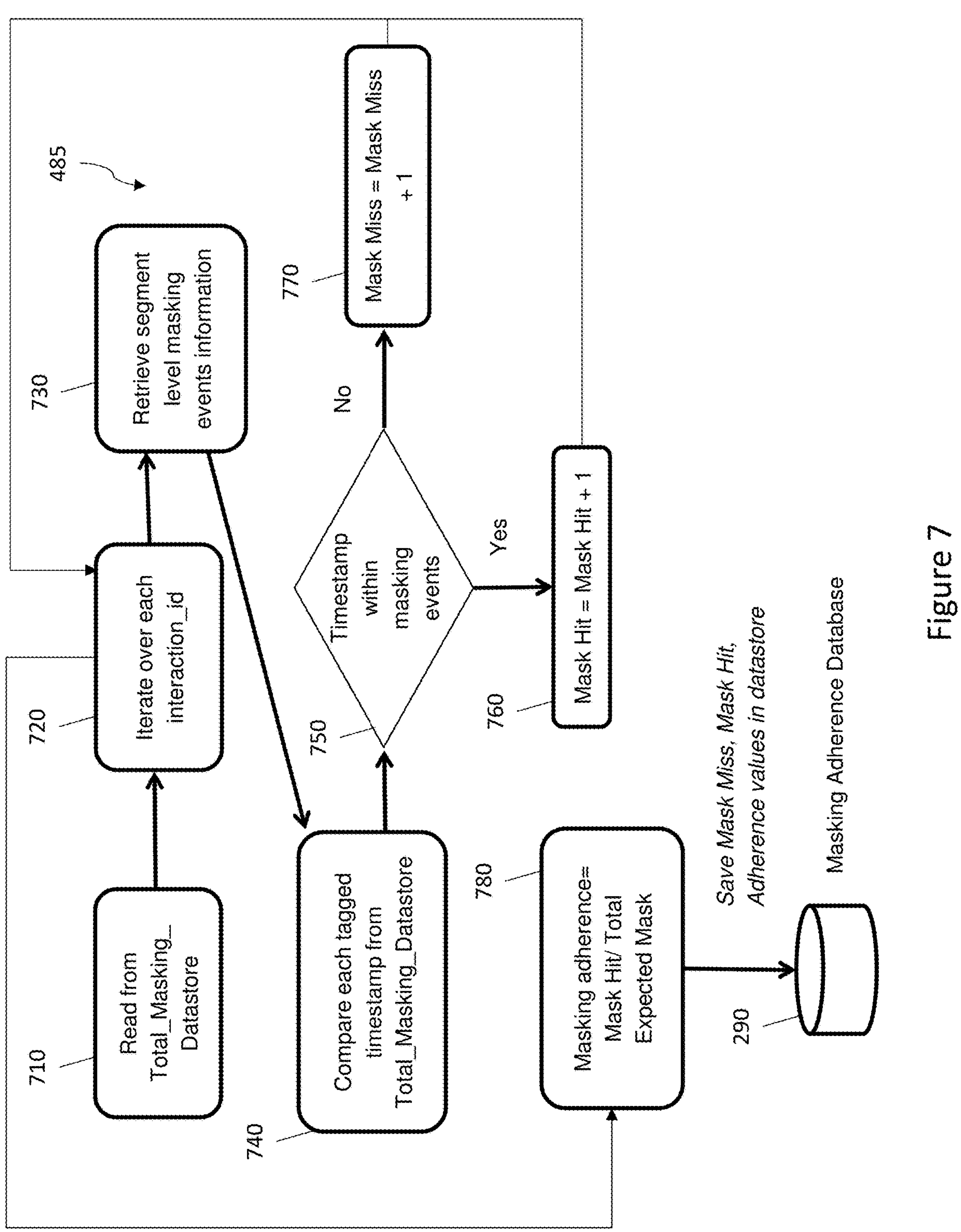
FIG. 7 is a representation, in flow diagram form, of at least a portion of an example interaction verification method, according to aspects of the present disclosure.

FIG. 7 is a representation, in flow diagram form, of at least a portion of an example interaction verification method 485, according to aspects of the present disclosure.

In step 710, the method 485 includes reading a masking candidate list 550 from the total masking datastore 560 (see FIG. 5).

In step 720, the method 485 includes selecting the next masking candidate from the masking candidate list 550. If no next candidate exists, then execution proceeds to step 780. Otherwise, execution proceeds to step 730.

In step 730, the method 485 includes retrieving, from the current masking candidate, the event information (e.g., data type and time stamp).

In step 740, the method 485 includes comparing the tagged time stamp against the transcript.

In step 750, the method 485 includes determining whether the current time stamp falls within a masking event within the transcript. If no, execution proceeds to step 770. If yes, execution proceeds to step 760.

In step 760, the method 485 includes determining that a successful masking occurred at the current time stamp. The mask_hit counter is incremented, and execution returns to step 720.

In step 770, the method 485 includes determining that a successful masking did not occur at the current time stamp. The mask_miss counter is incremented, and execution returns to step 720.

In step 780, the entire masking candidate list 550 has been evaluated, and so the method 485 includes computing the masking adherence score for the current interaction. The masking adherence score may for example be calculated as mask_hit/(mask_hit+mask_miss). The masking adherence score for the current interaction may then be reported, displayed, or stored within the total masking datastore 560 and/or the masking adherence database 290. The method 485 is now complete.

Figure 8:
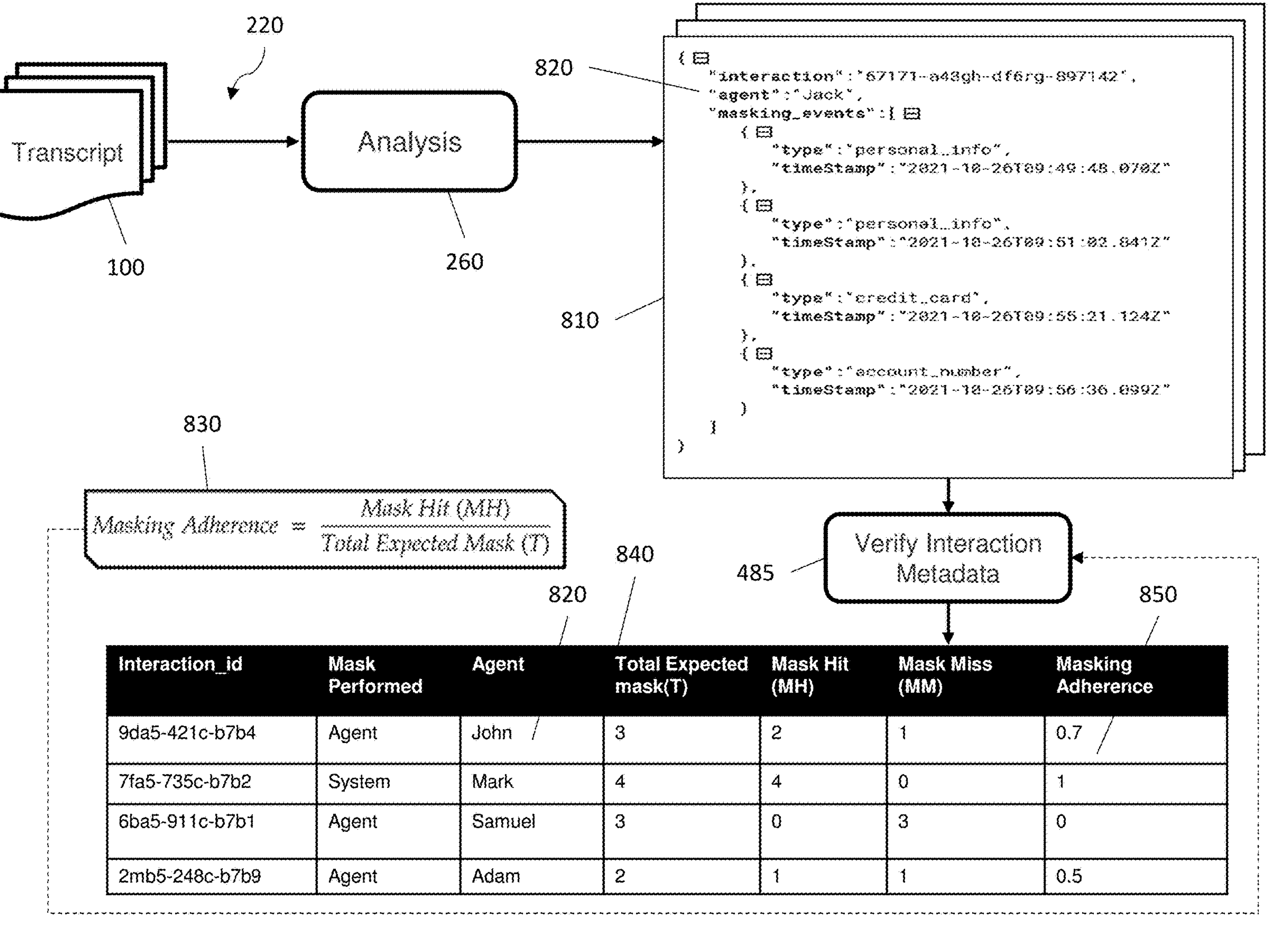
FIG. 8 is a representation, in block diagram form, of at least a portion of an example masking adherence module, according to aspects of the present disclosure.

FIG. 8 is a representation, in block diagram form, of at least a portion of an example masking adherence module 220, according to aspects of the present disclosure. An analysis step 260 receives a plurality of interaction transcripts 100 and outputs a plurality of tagged masking candidate lists 810, each including the associated agent's name 820. The tagged masking candidate list 810 is received by an interaction metadata step 485, which uses a masking adherence formula 830 to output a table, array, or database 840 that includes a masking adherence score 850 and agent's name 820 for each interaction. Other information may be provided in the table, array, or database as well, including but not limited to the number of mask hits, the number of mask misses, and the total expected number of masking events (e.g., the sum of mask hits and mask misses). The table, array, or database 840 may for example be, include, or be stored within, in the masking adherence database 290, or may be included in a report or displayed on a display.

Figure 9:
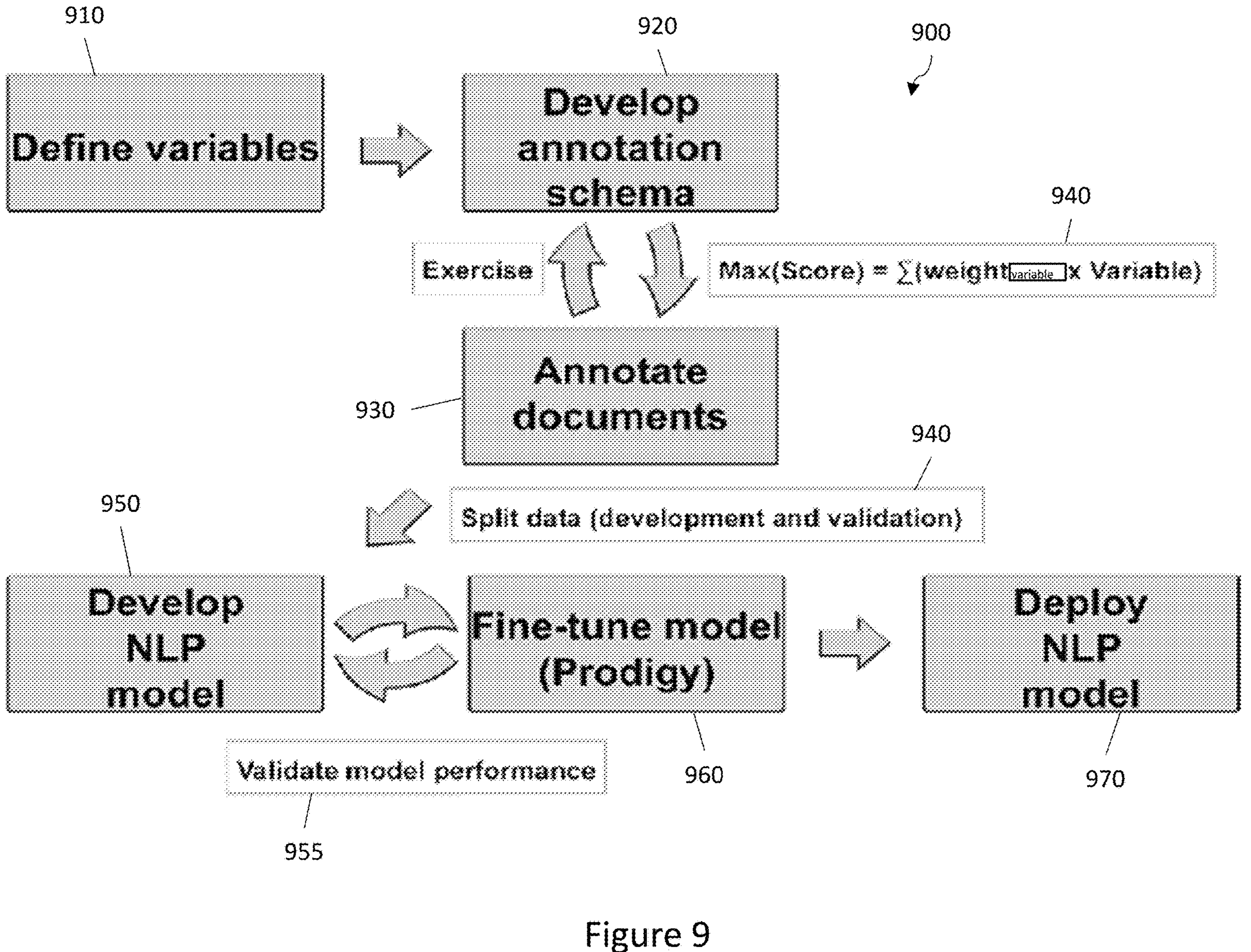
FIG. 9 is a representation, in flow diagram form, of at least a portion of an example NLP model training method, according to aspects of the present disclosure.

FIG. 9 is a representation, in flow diagram form, of at least a portion of an example NLP model training method 900, according to aspects of the present disclosure. The NLP model may for example be an NER NLP model 270 (as shown for example in FIG. 5).

In step 910, the method 900 includes defining the variables that will be evaluated by the NLP model.

In step 920, the method 920 involves developing an annotation schema, and iteratively annotating representative documents (e.g., sample interaction transcripts) in step 930, until a scoring function 940 exceeds a threshold value, or until the change in the scoring function 940 between iterations falls below a threshold convergence value.

In step 940, the method 900 includes splitting the annotated documents into two sets: a development set and a validation set.

In step 950, the method 900 includes developing the NLP model, and iteratively tuning the model in step 960 until a model performance criterion 955 is met. Execution them proceeds to step 970.

In step 970, the method 900 includes deploying the NLP model, e.g. for use within the masking adherence measurement system 200 (see FIG. 2). The method 970 is now complete.

Figure 10:
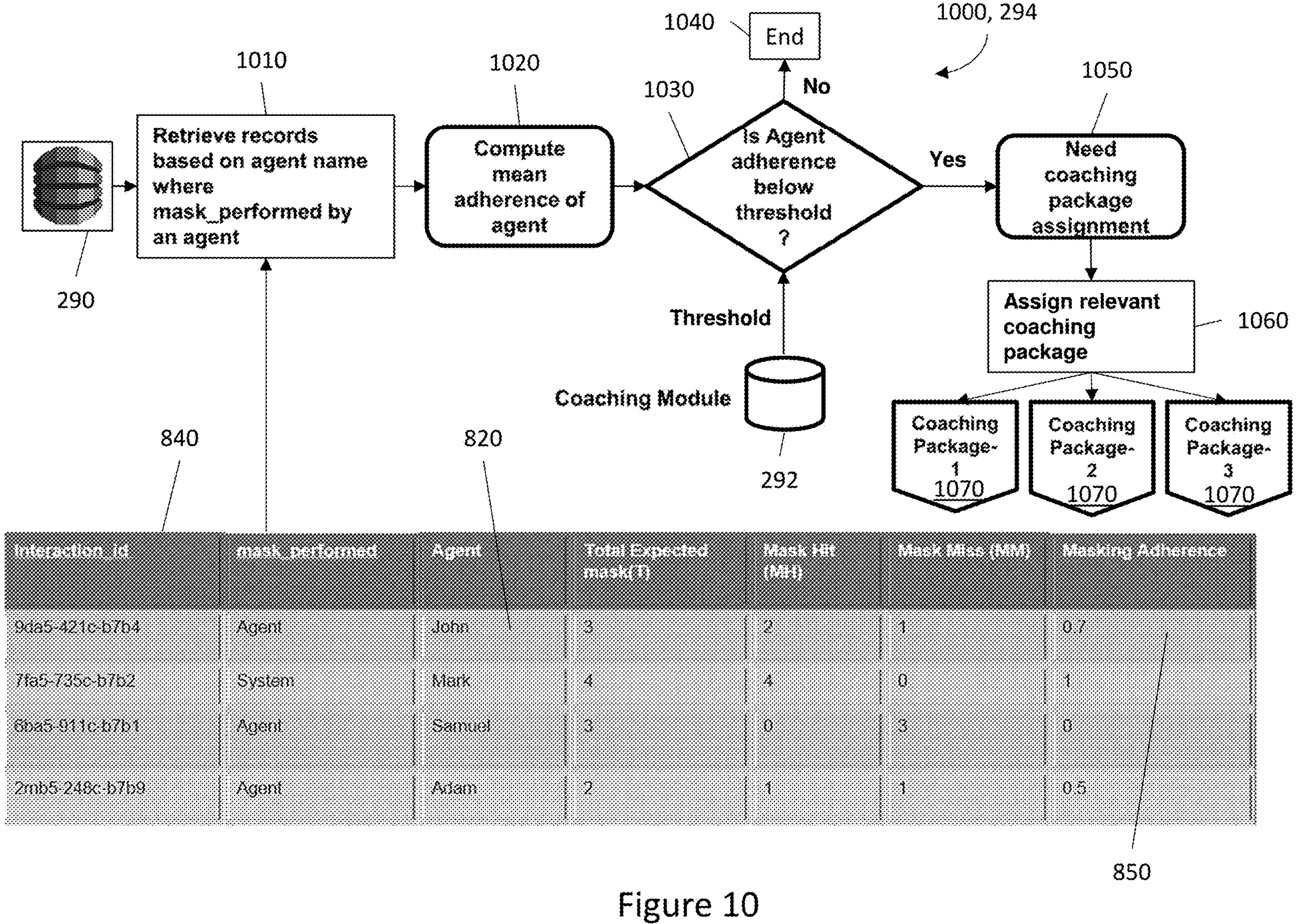
FIG. 10 is a representation, in block diagram form, of at least a portion of an example quality management method that may be for example be performed by a quality management module, according to aspects of the present disclosure.

FIG. 10 is a representation, in block diagram form, of at least a portion of an example quality management method 1000 that may be for example be performed by a quality management module 294, according to aspects of the present disclosure. The quality management method 1000 may for example utilize the masking adherence score 850 in assigning coaching packages to a particular agent. The method 1000 may for example be executed consecutively for each agent on a list (e.g., each agent currently working at a particular contact center).

In step 1010, the quality management method 1000 includes retrieving a table 840 from the masking adherence database 290. The table may for example be compiled by the mask adherence module as described above.

In step 1020, the quality management method 1000 includes computing a mean masking adherence score for a particular agent. This may be done for example by retrieving, from the table 840, all of the masking adherence scores 850 associated with a particular agent name 820, and averaging the retrieved scores.

In step 1030, the quality management method 1000 includes determining whether the average masking adherence score is below a threshold value. If yes, execution proceeds to step 1050. If no, execution proceeds to step 1040. The threshold value may for example be retrieved from the coaching module 292.

In step 1040, the quality management method 1000 includes determining that the average masking adherence score for the current agent is within acceptable parameters. The method is complete.

In step 1050, the quality management method 1000 includes determining that the average masking adherence score the fir current agent is not within acceptable parameters, and that coaching is required.

In step 1060, the quality management method 1000 includes determining which coaching package to assign. This determination may be made for example by retrieving formatted masking candidate lists 550 for that agent and performing at least some steps similar to those shown in FIG. 7, to determine which time stamps or which private data types are associated with mask misses. If the mask misses are primarily dependent on the time of day, then the coaching module 294 may for example assign a first coaching package 1070. If the mask misses are primarily associated with particular data types, then the coaching module 294 may for example assign a second or third coaching package 1070, as determined for example by a table associating particular data types with particular coaching packages. The method is now complete.

Figure 11:
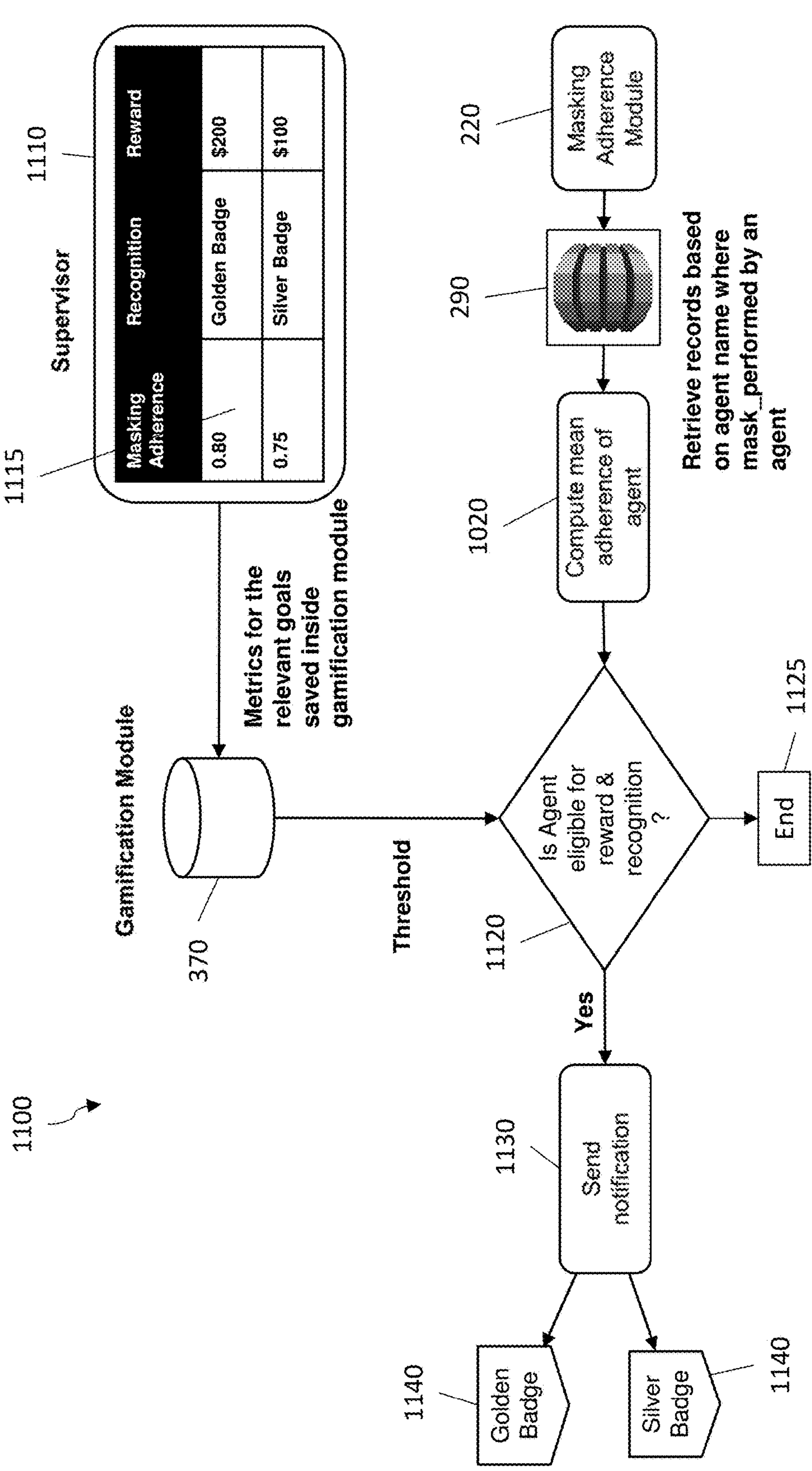
FIG. 11 is a representation, in block diagram form, of at least a portion of an example gamification method that may be for example be performed by a gamification module 370, according to aspects of the present disclosure.

FIG. 11 is a representation, in block diagram form, of at least a portion of an example gamification method 1100 that may be for example be performed by a gamification module 370, according to aspects of the present disclosure. In the example shown in FIG. 11, the gamification module 370 can be configured such that a supervisor can define thresholds related to agents' average masking adherence score. If the agent is found eligible and has an average masking adherence score above a specified threshold, then the relevant rewards and recognition badge will be provided.

In the example shown in FIG. 11, the masking adherence module 220 stores masking compliance records into the masking adherence database 290 as described above, and a computation step 1020 (see FIG. 10) computes the average masking adherence score for a particular agent.

The gamification module 370 receives a table, array, or database 1110 (e.g., provided or filled out by a contact center supervisor) that includes thresholds 1115.

In step 1120, the method 1100 includes determining whether the current agent is eligible for rewards and/or recognition. This may for example be based on a personnel database or other database indicating which agents are eligible. Examples of ineligible agents may include, but are not limited to, agents who are newly hired, who are trainees, who are on vacation, holiday, sick leave, or probation, or who have voluntarily opted out of the rewards and recognition program. Eligible agents may be all agents currently employed at a particular contact center who are not ineligible. If the agent is not eligible, execution proceeds to step 1125. If the agent is eligible, execution proceeds to step 1130.

In step 1125, the method 1100 is complete.

In step 1130, the method 1100 includes sending a notification 1140 to the agent, the agent's supervisor, or another person, database, or software module. The notification 1140 that is sent may depend on which threshold 1115 has been exceeded. In the example shown in FIG. 11, if the average masking adherence score for the current agent exceeds 0.8, then a "gold badge" notification 1140 is sent, whereas if the score exceeds 0.75 but not 0.8, then a "silver badge"

notification is sent. It is understood that other thresholds and other notification types may be sent instead or in addition (e.g., by altering the entries in the table 1110). The method 1100 is now complete.

Figure 12:
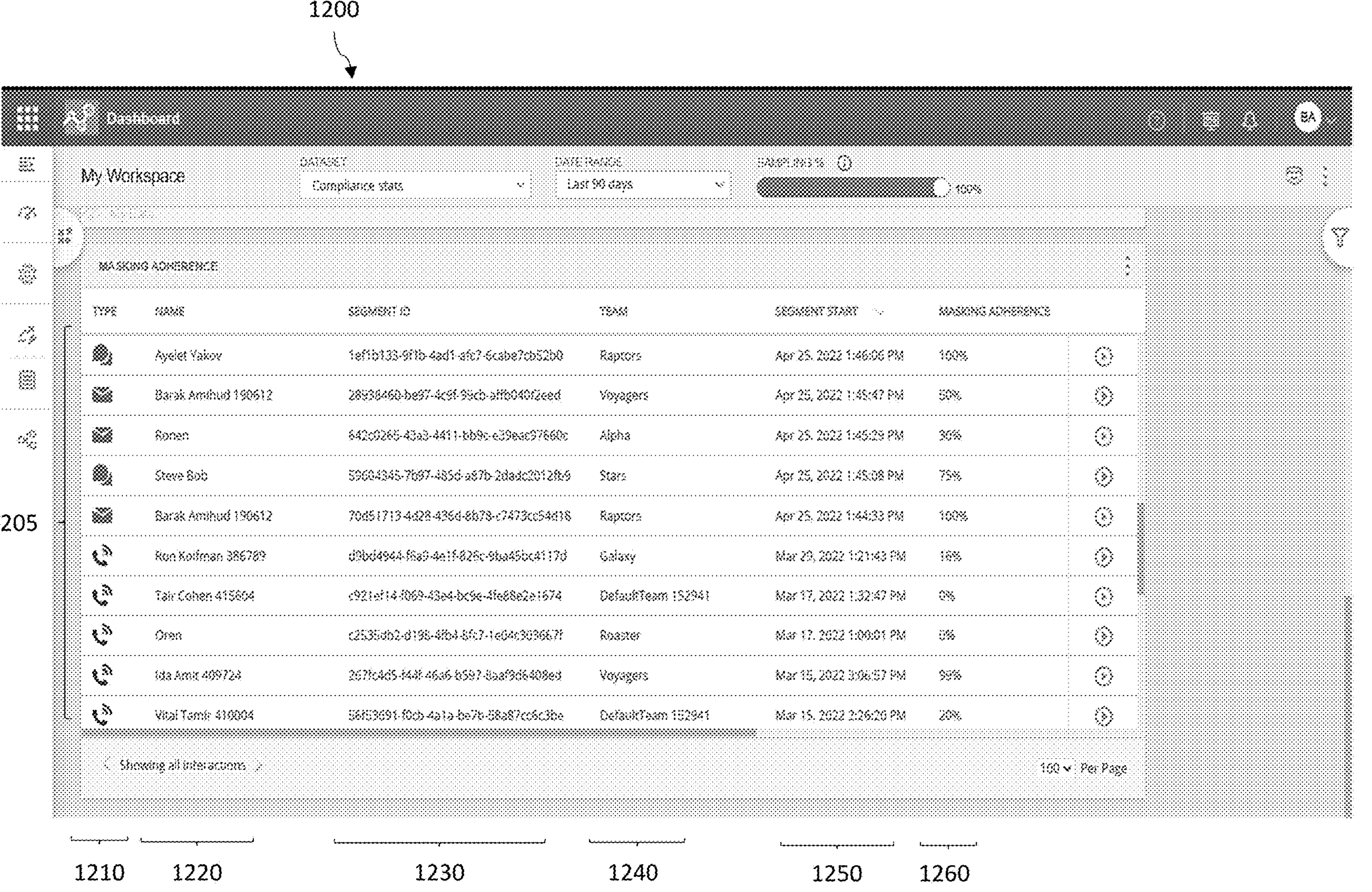
FIG. 12 shows an example masking adherence report, according to aspects of the present disclosure.

FIG. 12 shows an example masking adherence report 1200, according to aspects of the present disclosure. The masking adherence report might for example be generated by the masking adherence measurement system 200, the masking adherence module 220, the quality management module 294, the coaching module 292, the gamification module 296, or by other modules or methods as would be understood by a person of ordinary skill in the art. Depending on the implementation, the masking adherence report 1200 may be transmitted, stored, printed, displayed on a monitor, read aloud, etc.

In the example shown in FIG. 12, the masking adherence report 1200 includes a plurality of lines 1205, each of which represents a particular contact, and each of which includes fields such as a contact type 1210, an agent name 1220, a unique identifier 1230, a team name 1240, a start time and date 1250, and a masking adherence score 1260. A person of ordinary skill in the art will appreciate that other fields may be included in the report, the report may be organized differently than shown herein, and other types of reports, showing other variables disclosed herein, may be generated instead or in addition, without departing from the spirit of the present disclosure.

Figure 13:
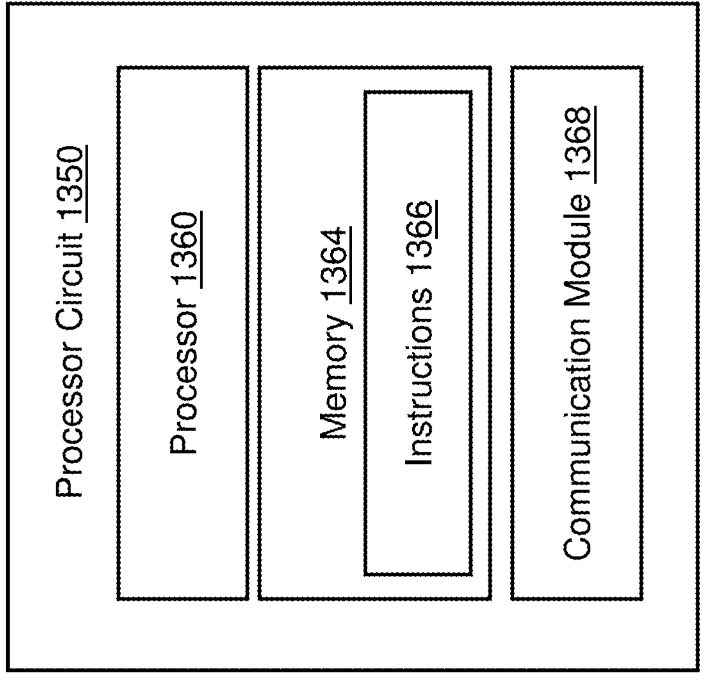
FIG. 13 is a schematic diagram of a processor circuit, according to aspects of the present disclosure.

FIG. 13 is a schematic diagram of a processor circuit 1350, according to aspects of the present disclosure. The processor circuit 1350 may be implemented in the masking adherence measurement system 200, or other devices or workstations (e.g., third-party workstations, network routers, etc.), or on a cloud processor or other remote processing unit, as necessary to implement the modules and methods disclosed herein. As shown, the processor circuit 1350 may include a processor 1360, a memory 1364, and a communication module 1368. These elements may be in direct or indirect communication with each other, for example via one or more buses.

The processor 1360 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1360 may also include another hardware device, a firmware device, or any combination thereof configured to perform the operations described herein. The processor 1360 may also be implemented as a combination of computing devices, e.g., a combination of a DSP and a microprocessor, a plurality of microprocessors, one or more microprocessors in conjunction with a DSP core, or any other such configuration.

The memory 1364 may include a cache memory (e.g., a cache memory of the processor 1360), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1364 includes a non-transitory computer-readable medium. The memory 1364 may store instructions 1366. The instructions 1366 may include instructions that, when executed by the processor 1360, cause the processor 1360 to perform the operations described herein. Instructions 1366 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1368 can include any electronic circuitry and/or logic circuitry to facilitate direct or indirect communication of data between the processor circuit 1350, and other processors or devices. In that regard, the communication module 1368 can be an input/output (I/O) device. In some instances, the communication module 1368 facilitates direct or indirect communication between various elements of the processor circuit 1350 and/or the masking adherence measurement system 200. The communication module 1368 may communicate within the processor circuit 1350 through numerous methods or protocols. Serial communication protocols may include but are not limited to United States Serial Protocol Interface (US SPI), Inter-Integrated Circuit ($I^2C$), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, or data sharing between the processor and a central server) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the masking adherence measurement system advantageously provides improved measurement, tracking, auditing, notification, and rewards associated with the masking of private data by contact centers. Accordingly, it can be seen that the masking adherence measurement system fills a long-standing need in the art, by addressing the limitations of present systems and improving the operation of contact center computer systems. A number of variations are possible on the examples and embodiments described above.

For example, different contact types, different private data types, or different masking rules may be employed than those shown herein.

Accordingly, the logical operations making up the embodiments of the technology described herein are referred to variously as operations, steps, objects, layers, elements, components, or modules. Furthermore, it should be understood that these may occur or be performed or arranged in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the dimensional reduction integrated fraud management system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the masking adherence measurement system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system adapted to automatically evaluate compliance to private data masking rules by a contact center service provider, the system comprising:

- a processor and a non-transitory computer readable medium operably coupled thereto, the computer readable medium comprising a plurality of instructions stored in association therewith that are accessible to, and executable by, the processor, to perform operations which comprise:
  - receiving a list of private data elements for which masking is required;
  - receiving a customer-service provider interaction transcript of a particular interaction between the service provider and a customer, wherein the transcript comprises a plurality of data elements that includes at least one private data element of the list of private data elements;
  - analyzing the transcript with natural language processing to identify times or locations within the transcript where the at least one private data element is recorded;
  - determining based on a set of compliance rules and the analyzed transcript whether, at the identified times or locations, any private data element of the at least one private data element is unmasked;
  - based on a private data element of the at least one private data element being unmasked, incrementing a mask miss counter, wherein the mask miss counter tracks a total number of unmasked private data elements; and
  - based on the mask miss counter divided by a total number of expected masked data elements exceeding a threshold, issuing an output to a display of an agent, manager, or supervisor, wherein the output is related to the at least one unmasked private data element.

2. The system of claim 1, wherein the transcript includes a recording of at least one of a text interaction, a text translation of a voice interaction, or computer screen activity.

3. The system of claim 1, wherein the list of private data elements includes at least one of a social security number, a national identification number, a credit card number, a person's name, a company name, an organization name, a phone number, a postal code, a date of birth, an email address, a physical address, a postal address, an income level, a net asset value, a purchase history, or medical information.

4. The system of claim 1, wherein the output comprises a mask compliance coaching module, a link to the mask compliance coaching module, or instructions for accessing the mask compliance coaching module.

5. The system of claim 1, wherein the operations further comprise computing a compliance statistic for at least one of the particular interaction or a plurality of interactions including the particular interaction.

6. The system of claim 5, wherein the output comprises an evaluation of the service provider or a report comparing the service provider to another service provider.

7. The system of claim 1, wherein at least one private data element of the list of private data elements is required to be private by a law or government regulation.

8. The system of claim 5, wherein the compliance statistic comprises at least one of a total number of private data elements, a total number of masked private data elements, a total number of unmasked private data elements, a ratio, fraction, or percentage of private data elements that are masked, or a ratio, fraction, or percentage of private data elements that are unmasked, an average of any of the foregoing, or a ratio between any two of the foregoing.

9. The system of claim 5, wherein the compliance statistic comprises a compliance score for the service provider.

10. The system of claim 9, wherein based on the compliance score for the service provider being below a first threshold value, issuing a coaching output comprising at least one of a mask compliance coaching module, a link to the mask compliance coaching module, or instructions for accessing the mask compliance coaching module.

11. The system of claim 9, wherein based on the compliance score for the service provider being above a second threshold value, issuing a reward or recognition output.

12. A computer-implemented method adapted to automatically evaluate compliance to private data masking rules by a contact center service provider, the method comprising:

receiving a list of private data elements for which masking is required;

receiving a customer-service provider interaction transcript of a particular interaction between the service provider and a customer, wherein the transcript comprises a plurality of data elements that includes at least one private data element of the list of private data elements;

with natural language processing, analyzing the transcript to identify times or locations within the transcript where the at least one private data element is recorded;

based on a set of compliance rules and the analyzed transcript, determining whether, at the identified times or locations, any private data element of the at least one private data element is unmasked; based on a private data element of the at least one private data element being unmasked, incrementing a mask miss counter, wherein the mask miss counter tracks a total number of unmasked private data elements; and based on the mask miss counter divided by a total number of expected masked data elements exceeding a threshold, issuing an output to a display of an agent, manager, or supervisor, wherein the output is related to the at least one unmasked private data element.

13. The computer-implemented method of claim 12, wherein the transcript includes a recording of at least one of a text interaction, a text translation of a voice interaction, or computer screen activity.

14. The computer-implemented method of claim 12, wherein the list of private data elements includes at least one of a social security number, a national identification number, a credit card number, a person's name, a company name, an organization name, a phone number, a postal code, a date of birth, an email address, a physical address, a postal address, an income level, a net asset value, a purchase history, or medical information.

15. The computer-implemented method of claim 12, further comprising computing a compliance statistic for at least one of the particular interaction or a plurality of interactions including the particular interaction.

16. The computer-implemented method of claim 15, wherein the compliance statistic comprises at least one of a total number of private data elements, a total number of masked private data elements, a total number of unmasked private data elements, a ratio, fraction, or percentage of private data elements that are masked, or a ratio, fraction, or percentage of private data elements that are unmasked, an average of any of the foregoing, or a ratio between any two of the foregoing.

17. The computer-implemented method of claim 15, wherein based on the compliance statistic being below a first threshold value, the output comprises a coaching output comprising at least one of a mask compliance coaching module, a link to the mask compliance coaching module, or instructions for accessing the mask compliance coaching module.

18. The computer-implemented method of claim 15, wherein based on the compliance statistic being above a second threshold value, the output comprises a reward or recognition output.

19. The computer-implemented method of claim 15, wherein the output comprises an evaluation of the service provider including the compliance statistic or a report comparing the compliance statistic to a second compliance statistic of a second service provider.

20. The computer-implemented method of claim 19, wherein the rule-based machine learning algorithm is a learning classifier system, association rule learning system, or artificial immune system.

* * * * *